US012752375B2

(12) United States Patent
Okamura

(10) Patent No.: US 12,752,375 B2
(45) Date of Patent: Oct. 6, 2026

(54) PROCESSING APPARATUS

(71) Applicant: DISCO CORPORATION, Tokyo (JP)

(72) Inventor: Takashi Okamura, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 810 days.

(21) Appl. No.: 18/193,783

(22) Filed: Mar. 31, 2023

(65) Prior Publication Data

US 2023/0321760 A1 Oct. 12, 2023

(30) Foreign Application Priority Data

Apr. 6, 2022 (JP) ................................ 2022-063225

(51) Int. Cl.
*B23K 26/38* (2014.01)
*B23K 26/00* (2014.01)
*B23K 26/03* (2006.01)
*B23K 26/08* (2014.01)
*B23K 101/40* (2006.01)

(52) U.S. Cl.
CPC .......... *B23K 26/38* (2013.01); *B23K 26/0093* (2013.01); *B23K 26/032* (2013.01); *B23K 26/0823* (2013.01); *B23K 26/083* (2013.01); *B23K 2101/40* (2018.08)

(58) Field of Classification Search
CPC .. B23K 26/38; B23K 26/362; B23K 26/0093; B23K 26/032; B23K 26/0823; B23K 26/083; B23K 2101/40
See application file for complete search history.

(56) References Cited

U.S. PATENT DOCUMENTS 7,732,729 B2 * 6/2010 Kobayashi ........... B23K 26/705 219/121.62
2002/0031899 A1 * 3/2002 Manor .................. B23K 26/40 438/460
2007/0057378 A1 * 3/2007 Arai .................... H01L 21/6835 257/777

(Continued)

FOREIGN PATENT DOCUMENTS

CN 106256476 A * 12/2016 ........... H01L 21/268
DE 10 2020 200 257 A1 8/2020

(Continued)

OTHER PUBLICATIONS

Office Action issued in counterpart German patent application No. 10 2023 202 920.0, dated Jul. 9, 2025.

(Continued)

*Primary Examiner* — Ryan C Clark
(74) *Attorney, Agent, or Firm* — Greer, Burns & Crain, Ltd

(57) ABSTRACT

A processing apparatus that processes a workpiece includes a chuck table that holds the workpiece including multiple streets that intersect each other on a holding surface, a processing unit that processes the workpiece held by the chuck table along a corresponding one of the streets, and a controller. When processing is suspended with an unprocessed region left while the processing unit is caused to process the workpiece from one end to the other end of the street, the controller rotates the chuck table by 180 degrees and causes the processing unit to process the unprocessed region of the workpiece from the other end of the street.

6 Claims, 7 Drawing Sheets

(56) References Cited

U.S. PATENT DOCUMENTS

| | | | | |
|---|---|---|---|---|
| 2008/0128396 | A1* | 6/2008 | Shigematsu | B23K 26/702 219/121.67 |
| 2009/0042368 | A1* | 2/2009 | Sekiya | H01L 21/3065 438/460 |
| 2009/0197351 | A1* | 8/2009 | Morikazu | B23K 26/034 438/5 |
| 2018/0161921 | A1* | 6/2018 | Morikazu | B23K 26/55 |
| 2018/0200830 | A1* | 7/2018 | Yodo | B23K 26/57 |
| 2018/0330957 | A1* | 11/2018 | Wei | H01L 21/3065 |
| 2019/0122928 | A1* | 4/2019 | Norimoto | H01L 21/304 |
| 2020/0227319 | A1 | 7/2020 | Yamamoto | |
| 2021/0053150 | A1 | 2/2021 | Mori et al. | |
| 2021/0237297 | A1 | 8/2021 | Kojima et al. | |

FOREIGN PATENT DOCUMENTS

| | | | | |
|---|---|---|---|---|
| DE | 10 2021 200 656 | A1 | 8/2021 | |
| JP | 63074605 | A | 4/1988 | |
| JP | 2005-251986 | A | 9/2005 | |
| JP | 2013074198 | A | 4/2013 | |
| JP | 2020077668 | A | 5/2020 | |
| WO | WO-2019188518 | A1 * | 10/2019 | B23K 26/53 |

OTHER PUBLICATIONS

Office Action issued in counterpart Japanese patent application No. 2022-063225, dated Nov. 4, 2025.

* cited by examiner

PROCESSING APPARATUS

BACKGROUND OF THE INVENTION

Field of the Invention

The present invention relates to a processing apparatus that processes and divides a workpiece such as a semiconductor wafer along streets.

Description of the Related Art

In manufacturing processes of device chips to be incorporated into electronic equipment or the like, plate-shaped workpieces typified by semiconductor wafers and resin package substrates are processed by various processing apparatuses. Planned dividing lines in a lattice manner referred to as streets are set in the plate-shaped workpiece, and devices such as integrated circuits (ICs) and large-scale integration circuits (LSIs) are disposed in respective regions marked out by the streets. When the workpiece is divided along these streets, individual device chips are manufactured.

A processing apparatus having a function of detecting an abnormality in processing that is being executed is known (refer to Japanese Patent Laid-open No. 2013-74198). In this processing apparatus, when some kind of abnormality is sensed while processing of a workpiece is executed, the processing is temporarily stopped. The user or the like of the processing apparatus checks the states of the processing apparatus and the workpiece and executes the necessary adjustment for the processing apparatus and then resumes the processing. However, in some cases, the processing is resumed without thorough consideration in the state in which the adjustment for the temporarily-stopped processing apparatus is insufficient, and the abnormality continuously occurs in the processing apparatus. Thus, a processing apparatus is known in which resumption conditions of processing different depending on the contents of an abnormality that has occurred in processing are defined and a specific resumption procedure is required when a specific abnormality has occurred (refer to Japanese Patent Laid-open No. 2020-77668).

SUMMARY OF THE INVENTION

When an abnormality is sensed and processing stops while a workpiece is processed along one street, an unprocessed region is left in this street. Moreover, when the street in the middle of the processing is reprocessed after adjustment of the processing apparatus is completed, the processing of the unprocessed region may be started from the position at which the processing has stopped. In this case, for resuming the processing from the middle of the street, a special procedure that takes labor and time is necessary. In addition, a processing tool acts on an abnormal processing mark formed last before the processing stop, and an unexpected force is applied to the processing tool or the workpiece. As a result, the processing tool or the like may break in some cases.

Alternatively, there is the case in which, when an abnormality is sensed and processing stops, reprocessing of the street in the middle of the processing is abandoned and the processing is resumed from the next street. In this case, the street along which an unprocessed region is left is left as it is. Accordingly, an undivided region remains in the wafer, and the number of obtained device chips may decrease. Thus, it is also conceivable that the user operates the processing apparatus to reprocess the relevant street from a preferable position at which breakage of the processing tool or the like will not occur. However, in this case, labor and time are required, and the processing efficiency significantly lowers.

Thus, an object of the present invention is to provide a processing apparatus that can reprocess a workpiece without applying a load to a processing tool and without significantly lowering the number of manufactured device chips and the processing efficiency when an abnormality has occurred in processing of the workpiece.

In accordance with an aspect of the present invention, there is provided a processing apparatus including a chuck table that holds a workpiece including a plurality of streets that intersect each other on a holding surface, a processing unit that processes the workpiece held by the chuck table along a corresponding one of the streets, a processing feed unit that moves the chuck table and the processing unit relative to each other in a direction parallel to the holding surface along a processing feed direction, a rotation unit capable of rotating the chuck table around a rotation axis along a direction perpendicular to the holding surface, and a controller that controls the chuck table, the processing unit, the processing feed unit, and the rotation unit. When processing is suspended with an unprocessed region left while the processing unit is caused to process the workpiece from one end to the other end of the street with relative movement of the chuck table and the processing unit along the processing feed direction by the processing feed unit, the controller rotates the chuck table by 180 degrees by the rotation unit and causes the processing unit to process the unprocessed region of the workpiece from the other end of the street while moving the chuck table and the processing unit relative to each other along the processing feed direction by the processing feed unit.

Preferably, the processing unit is a cutting unit that cuts the workpiece by a circular annular cutting blade.

Further, preferably, the processing unit is a laser processing unit that irradiates the workpiece with a laser beam to execute laser processing on the workpiece.

More preferably, the controller has an abnormality detecting section that detects an abnormality that occurs while the workpiece is processed by the processing unit, and suspends processing of the workpiece by the processing unit when the abnormality is detected by the abnormality detecting section.

Further preferably, the processing apparatus further includes an imaging unit that images the workpiece held by the chuck table, and the abnormality detecting section causes the imaging unit to image a position processed by the processing unit on the workpiece and detects the abnormality on the basis of a captured image acquired by the imaging unit.

In the processing apparatus according to the aspect of the present invention, when processing is suspended while the processing unit is caused to process the workpiece, the controller rotates the chuck table by 180 degrees and causes the processing unit to process the unprocessed region in the opposite direction. Thus, the unprocessed region is not let stand, and device chips are manufactured with the minimum necessary loss. Further, in the street to be reprocessed, the processing is not resumed from the place of the suspension of the processing, and the reprocessing is executed from the other end side of the street on which an abnormality is not present. In this case, when the reprocessing is started, the processing tool is not caused to act on the place of the suspension of the processing at which an abnormality exists. Therefore, breakage and so forth of the processing tool and so forth can be prevented. Moreover, for the reprocessing, the user or the like of the processing apparatus does not need to input a particular instruction regarding the start position of the reprocessing and so forth to the processing apparatus and operate the processing apparatus. In addition, a procedure that requires attention for executing the reprocessing from the middle of the street is unnecessary. Thus, the processing efficiency becomes favorable.

Therefore, the present invention provides a processing apparatus that can reprocess a workpiece without applying a load to a processing tool and without significantly lowering the number of manufactured device chips and the processing efficiency when an abnormality has occurred in processing of the workpiece.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
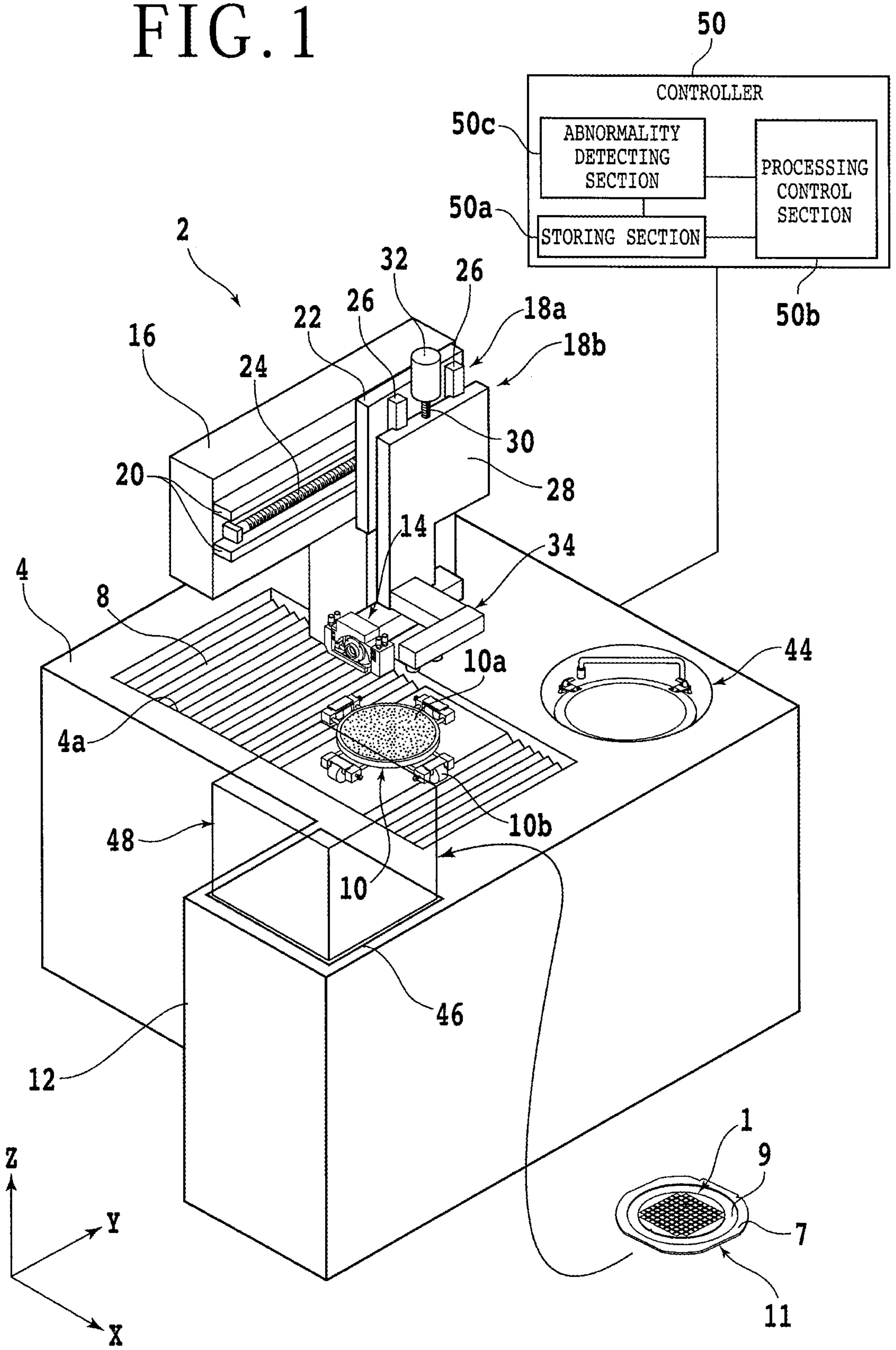
FIG. 1 is a perspective view schematically illustrating one example of a processing apparatus.
Figure 2:
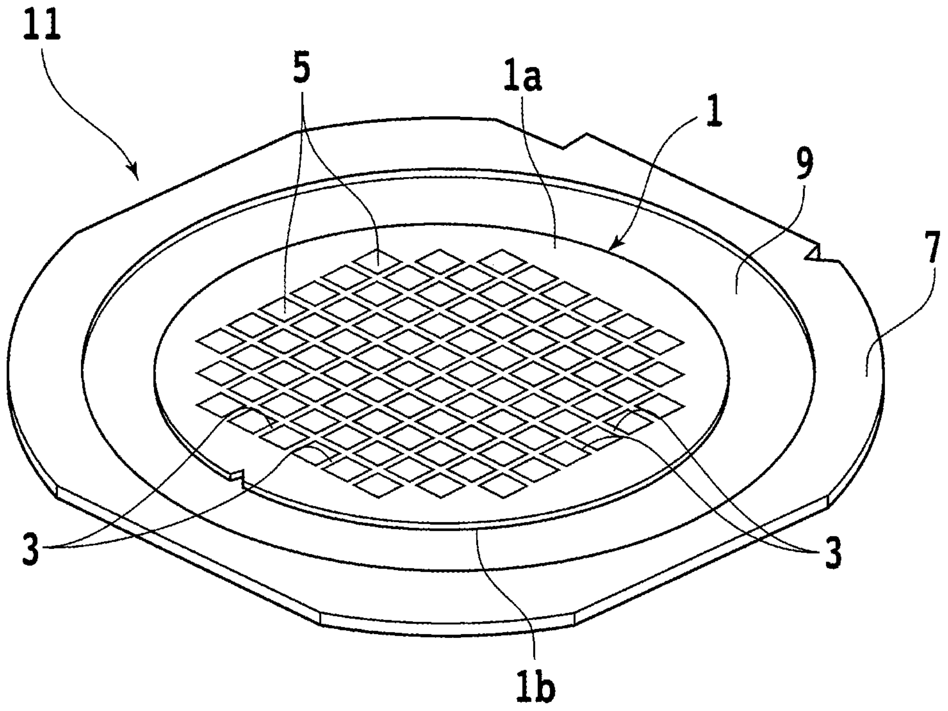
FIG. 2 is a perspective view schematically illustrating a workpiece.

An embodiment of the present invention will be described in detail below with reference to the accompanying drawings. A processing apparatus according to the present embodiment processes a plate-shaped workpiece such as a semiconductor wafer. FIG. 1 is a perspective view schematically illustrating a processing apparatus 2 and a frame unit 11 including a workpiece 1. FIG. 2 is a perspective view schematically illustrating the frame unit 11.

First, the workpiece 1 to be processed by the processing apparatus 2 will be described. For example, the workpiece 1 is a substantially circular plate-shaped wafer formed from silicon (Si), silicon carbide (SiC), gallium nitride (GaN), gallium arsenide (GaAs), or other semiconductor materials. Alternatively, the workpiece 1 may be a plate-shaped substrate or the like composed of a material such as sapphire, quartz, glass, or ceramic. The glass is alkali glass, non-alkali glass, soda-lime glass, lead glass, borosilicate glass, quartz glass, or the like, for example. Further, the workpiece 1 may be a package substrate in which multiple chips are sealed by a resin. However, the workpiece 1 is not limited thereto.

Figure 4:
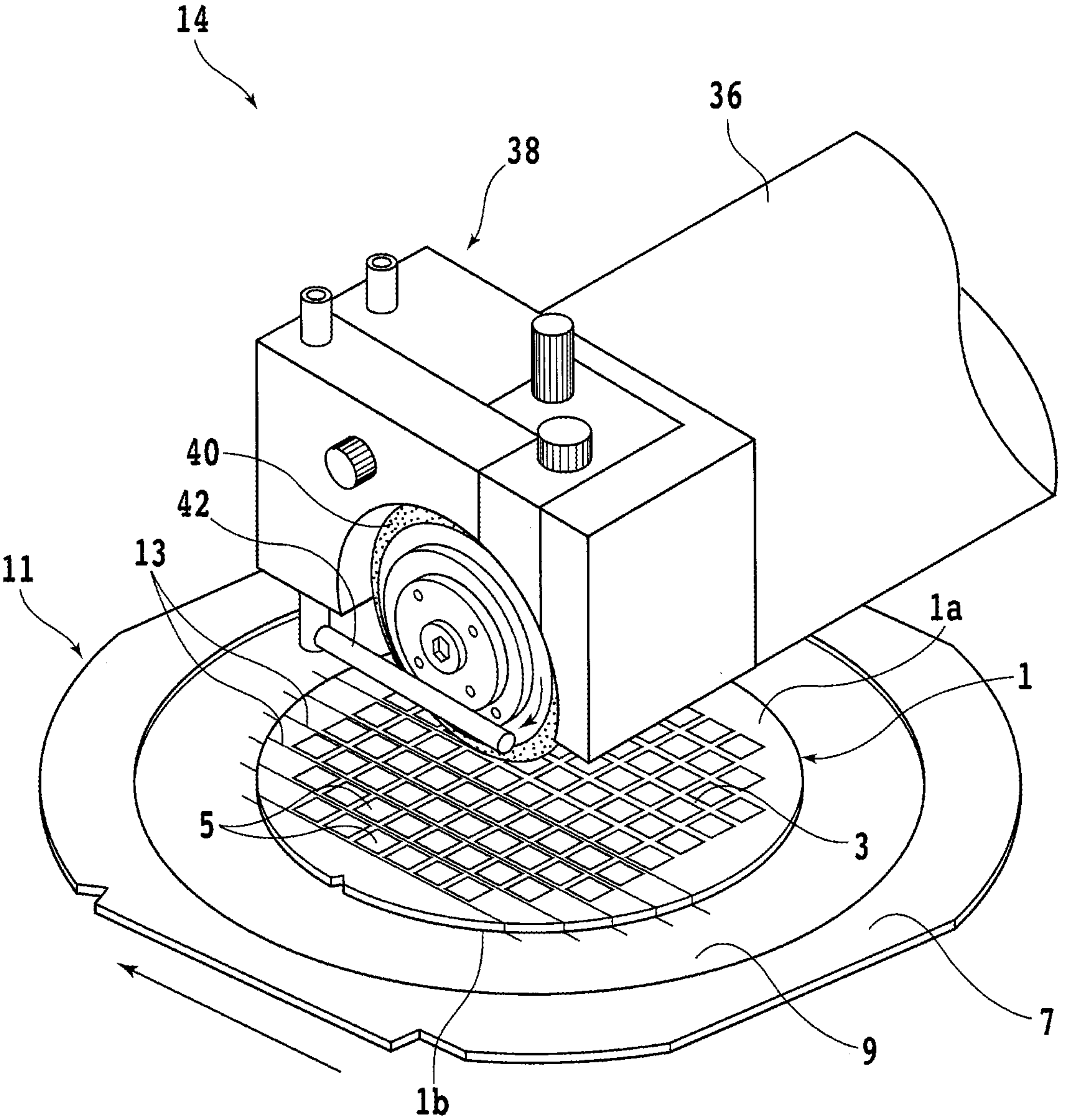
FIG. 4 is a perspective view schematically illustrating the processing unit that processes the workpiece.

In FIG. 2, a perspective view schematically illustrating a circular plate-shaped semiconductor wafer that is one example of the workpiece 1 is included. For example, multiple devices 5 such as ICs and LSIs are formed on a front surface 1*a* of the workpiece 1. In the workpiece 1, planned dividing lines referred to as streets 3 are set between the devices 5. Further, when the workpiece 1 is cut along the streets 3 and processing marks (dividing grooves) 13 are formed to divide the workpiece 1 as illustrated in FIG. 4 and so forth, individual device chips can be formed. The cutting of the workpiece 1 can be executed by a cutting apparatus including a circular annular cutting blade. The processing apparatus 2 according to the present embodiment is, for example, a cutting apparatus that cuts the workpiece 1. However, the workpiece 1 may be processed by the processing apparatus 2 other than the cutting apparatus. For example, the processing apparatus 2 may be a laser processing apparatus that can execute laser processing on the workpiece 1 through irradiation with a laser beam along the streets 3. Although the present embodiment will be described below by taking as an example a case in which the processing apparatus 2 is the cutting apparatus, the processing apparatus 2 is not limited thereto.

Before the workpiece 1 is loaded in the processing apparatus 2, the workpiece 1 is integrated with a dicing tape 9 and a ring frame 7, and the frame unit 11 is formed. FIG. 2 is a perspective view schematically illustrating the workpiece 1 included in the frame unit 11. The dicing tape 9 is stuck to the ring frame 7 to close up an opening of the ring frame 7 formed of metal such as aluminum. Further, the side of a back surface 1*b* of the workpiece 1 is stuck to the dicing tape 9 exposed in the opening of the ring frame 7. For example, the dicing tape 9 is an adhesive tape including a base layer and an adhesive layer supported by the base layer. However, the dicing tape 9 is not limited thereto and does not need to include the adhesive layer. For example, the dicing tape 9 may be a sheet formed of a polyolefin-based material or a sheet formed of a polyester-based material. In this case, the frame unit 11 can be formed by integrating the sheet with the workpiece 1 and the ring frame 7 by a method such as thermocompression bonding.

When the frame unit 11 is formed, the workpiece 1 can be treated through the ring frame 7 and the dicing tape 9, and therefore handling of the workpiece 1 becomes easy. In addition, the device chips formed through dividing of the workpiece 1 are fixed to the dicing tape 9 as they are, and therefore handling of the device chips also becomes easy. When the dicing tape 9 is expanded outward in a radial direction inside the opening of the ring frame 7 after the workpiece 1 is divided, a gap is generated between the individual device chips, and therefore picking-up of the device chips is also easy.

Figure 3:
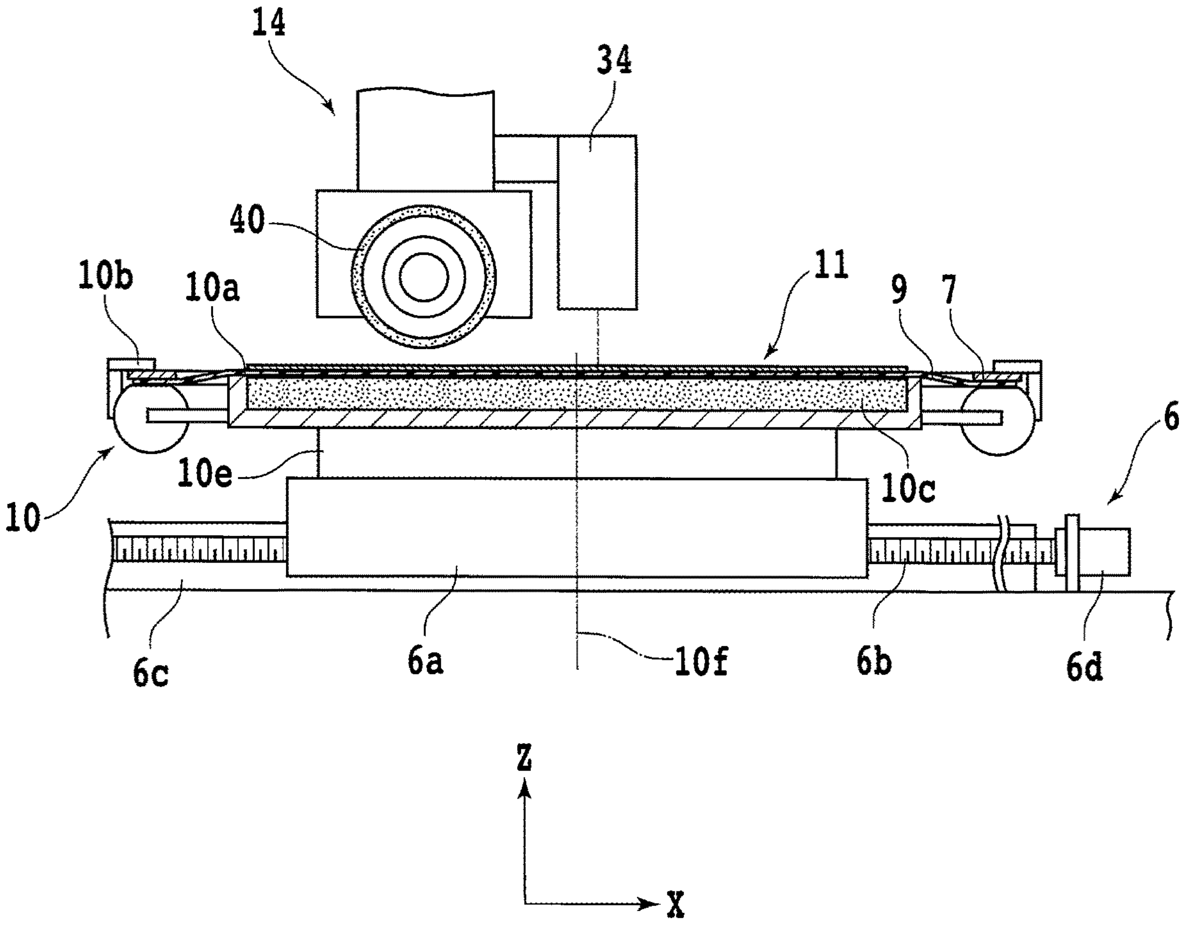
FIG. 3 is a side view schematically illustrating a chuck table, a processing unit, and a processing feed unit.

Next, the processing apparatus 2 that processes the workpiece 1 will be described. FIG. 1 is a perspective view schematically illustrating a cutting apparatus that is one example of the processing apparatus 2 according to the present embodiment. The processing apparatus 2 includes a base 4 that supports respective constituent elements. A rectangular opening 4*a* that is long in an X-axis direction (processing feed direction) is formed in an upper surface of the base 4. FIG. 3 is a side view schematically illustrating structural objects inside the opening 4*a*. An X-axis moving table 6*a* and a processing feed unit 6 that moves the X-axis moving table 6*a* in the processing feed direction (X-axis direction) are disposed in the opening 4*a*. A chuck table 10 is placed over the X-axis moving table 6*a*.

The processing feed unit 6 has a pair of X-axis guide rails 6*c* disposed along the X-axis direction on a bottom part in the opening 4*a*. The X-axis moving table 6*a* is slidably attached to the X-axis guide rails 6*c*. A nut part (not illustrated) is disposed on a bottom part of the X-axis moving table 6*a*, and an X-axis ball screw 6*b* parallel to the X-axis guide rails 6*c* is screwed to this nut part. An X-axis pulse motor 6*d* is coupled to one end part of the X-axis ball screw 6*b*. When the X-axis ball screw 6*b* is rotated by the X-axis pulse motor 6*d*, the X-axis moving table 6*a* moves in the processing feed direction (X-axis direction) while sliding relative to the X-axis guide rails 6*c*. When the processing feed unit 6 is actuated and the X-axis moving table 6*a* is moved, processing feed of the chuck table 10 placed over the X-axis moving table 6*a* is executed. The processing feed unit 6 is configured by the X-axis moving table 6*a*, the X-axis ball screw 6*b*, the X-axis guide rails 6*c*, the X-axis pulse motor 6*d*, and so forth and has a function of executing processing feed of the chuck table 10.

The processing feed unit 6 may move a processing unit 14 to be described later along the processing feed direction instead of the chuck table 10 or may move the chuck table 10 and the processing unit 14. That is, the processing feed unit 6 has a function of moving the chuck table 10 and the processing unit 14 relative to each other along the processing feed direction.

As illustrated in FIG. 1, a dust-proof, drip-proof cover 8 that covers the processing feed unit 6 is disposed at an upper end part of the opening 4*a*. The dust-proof, drip-proof cover 8 keeps on covering the processing feed unit 6 while parts thereof on front and rear sides of the chuck table 10 each expand or contract in association with movement of the chuck table 10. The chuck table 10 is installed over the X-axis moving table 6*a*. A porous component 10*c* (see FIG. 3) is buried in an upper surface of the chuck table 10, and an upper surface of the porous component 10*c* is a holding surface 10*a*. A suction path having one end that leads to the porous component 10*c* and the other end connected to a suction source configured by a pump or the like that is not illustrated is formed inside the chuck table 10. Further, clamps 10*b* for grasping the ring frame 7 of the frame unit 11 are disposed around the chuck table 10.

A protruding part 12 that protrudes from the base 4 toward a lateral side is disposed at a corner part on a front side of the base 4 of the processing apparatus 2. A space is formed inside the protruding part 12, and a cassette elevator 46 is installed in this space. A cassette 48 in which multiple frame units 11 can be housed is placed on an upper surface of the cassette elevator 46. The frame unit 11 including the workpiece 1 is housed in the cassette 48 and is loaded in the processing apparatus 2. The cassette elevator 46 raises and lowers the cassette 48.

A conveying unit (not illustrated) that conveys the frame unit 11 from the cassette 48 to the chuck table 10 is disposed at a position close to the opening 4*a*. The frame unit 11 drawn out from the cassette 48 by the conveying unit is placed on the holding surface 10*a* of the chuck table 10. Then, when the ring frame 7 is grasped by the clamps 10*b* and a negative pressure generated by the suction source is caused to act on the workpiece 1 with the interposition of the dicing tape 9 through the suction path and the porous component 10*c*, the workpiece 1 is held under suction by the chuck table 10. The chuck table 10 is coupled to a rotation unit 10*e* having a rotational drive source such as a motor and is supported, and is rotated around a rotation axis 10*f* along the direction perpendicular to the holding surface 10*a*.

On the upper surface of the base 4, a support structure 16 that supports the processing unit 14 that processes the workpiece 1 is disposed to hang over the opening 4*a*. An indexing feed unit 18*a* that moves the processing unit 14 along an indexing feed direction (Y-axis direction) and a raising-lowering unit 18*b* that raises and lowers the processing unit 14 are disposed at an upper part of the front face of the support structure 16.

The indexing feed unit 18*a* includes a pair of Y-axis guide rails 20 that are disposed on the front face of the support structure 16 and are parallel to the Y-axis direction. A Y-axis moving plate 22 is slidably attached to the Y-axis guide rails 20. A nut part (not illustrated) is disposed on a back surface side (rear face side) of the Y-axis moving plate 22, and a Y-axis ball screw 24 parallel to the Y-axis guide rails 20 is screwed to this nut part. A Y-axis pulse motor (not illustrated) is coupled to one end part of the Y-axis ball screw 24. When the Y-axis ball screw 24 is rotated by the Y-axis pulse motor, the Y-axis moving plate 22 moves in the Y-axis direction along the Y-axis guide rails 20.

The raising-lowering unit 18*b* is disposed on a front surface side (in front) of the Y-axis moving plate 22. The raising-lowering unit 18*b* includes a pair of Z-axis guide rails 26 that are fixed to the front surface of the Y-axis moving plate 22 and are parallel to a Z-axis direction. A Z-axis moving plate 28 is slidably attached to the Z-axis guide rails 26. A nut part (not illustrated) is disposed on a back surface side (rear face side) of the Z-axis moving plate 28, and a Z-axis ball screw 30 parallel to the Z-axis guide rails 26 is screwed to this nut part. A Z-axis pulse motor 32 is coupled to one end part of the Z-axis ball screw 30. When the Z-axis ball screw 30 is rotated by the Z-axis pulse motor 32, the Z-axis moving plate 28 moves in the Z-axis direction along the Z-axis guide rails 26.

The processing unit 14 that processes the workpiece 1 held by the chuck table 10 and an imaging unit (camera unit) 34 that images an upper surface of the workpiece 1 held by the chuck table 10 are fixed to a lower part of the Z-axis moving plate 28. When the Y-axis moving plate 22 is moved in the Y-axis direction by the indexing feed unit 18*a*, indexing feed of the processing unit 14 and the imaging unit 34 is executed. Further, when the Z-axis moving plate 28 is moved in the Z-axis direction by the raising-lowering unit 18*b*, the processing unit 14 and the imaging unit 34 move up and down in the Z-axis direction.

In FIG. 3, a side view schematically illustrating part of the processing unit 14 is included. Further, a perspective view schematically illustrating the processing unit 14 is included in FIG. 4. For example, the processing unit 14 is a cutting unit that includes a circular annular cutting blade (processing tool) 40 and cuts the workpiece 1 by the cutting blade 40. The processing unit (cutting unit) 14 includes a spindle housing 36 in which the base end side of a spindle (not illustrated) that configures a rotation axis parallel to the Y-axis direction is rotatably housed. A rotational drive source such as a motor that rotates the spindle is housed inside the spindle housing 36, and the spindle is rotated when this rotational drive source is actuated. The circular annular cutting blade 40 is fixed to the tip of the spindle. Rotating the spindle can rotate the cutting blade 40.

The cutting blade 40 includes an abrasive part containing a bond formed into a circular annular shape with a metal material, resin material, or the like and abrasive grains that are formed of diamond or the like and are dispersed and fixed in the bond. The Z-axis moving plate 28 is moved, and the cutting blade 40 is lowered to a predetermined height. Then, the processing feed unit 6 is actuated and processing feed of the chuck table 10 is executed to bring the abrasive part of the cutting blade 40 being rotated into contact with the workpiece 1. This causes the workpiece 1 to be cut.

As illustrated in FIG. 4, the processing unit 14 further includes a blade cover 38 that covers the cutting blade 40 and a cutting water supply nozzle 42 connected to the blade cover 38. When the workpiece 1 is cut by the cutting blade 40, cutting dust and processing heat are generated from the abrasive part and the workpiece 1. Hence, cutting water composed of purified water or the like is jetted from the cutting water supply nozzle 42 to the cutting blade 40 and the workpiece 1 while the workpiece 1 is cut by the cutting blade 40. The cutting water removes the cutting dust and the processing heat.

However, the processing unit 14 is not limited thereto. The processing unit 14 may be a laser processing unit that executes laser processing on the workpiece 1 by a laser beam. In this case, the processing unit 14 has a laser oscillator and a processing head and irradiates the workpiece 1 held by the chuck table 10 with the laser beam oscillated by the laser oscillator from the processing head. The laser processing is executed when the processing feed unit 6 is actuated to execute processing feed of the workpiece 1 while the workpiece 1 is irradiated with the laser beam with the focal point of the laser beam positioned to a predetermined height.

The imaging unit (camera unit) 34 images the front surface 1*a* of the workpiece 1 held by the chuck table 10. The imaging unit 34 includes an imaging element such as a charge coupled device (CCD) sensor or a complementary metal oxide semiconductor (CMOS) sensor, for example, and has a function of transmitting a captured image to a controller (control unit) 50 to be described later. The captured image obtained by the imaging unit 34 is used when the processing unit 14 is positioned to process a predetermined place. Further, whether or not the processing result is favorable can be evaluated by acquiring a captured image in which a region obtained after the processing of the workpiece 1 appears.

A cleaning unit 44 that cleans the workpiece 1 obtained after processing is disposed on a rear side relative to the opening 4*a* of the base 4. The workpiece 1 obtained after processing is conveyed from the chuck table 10 to the cleaning unit 44 by a conveying mechanism that is not illustrated. The cleaning unit 44 includes a spinner table that holds under suction the workpiece 1 in a cylindrical cleaning space. Further, a jet nozzle that jets a fluid for cleaning (typically, binary fluid in which water and air are mixed) toward the workpiece 1 is disposed over the spinner table. When the spinner table that holds the workpiece 1 is rotated and the fluid for cleaning is jetted from the jet nozzle, the workpiece 1 can be cleaned. The workpiece 1 cleaned by the cleaning unit 44 is housed in the cassette 48 by a conveying mechanism (not illustrated), for example.

The processing apparatus 2 further includes the controller (control unit) 50 that controls the respective constituent elements including the chuck table 10, the processing unit 14, the processing feed unit 6, the rotation unit 10*e*, the imaging unit 34, the indexing feed unit 18*a*, and the raising-lowering unit 18*b*. For example, the controller 50 is configured by a computer including a processing device such as a central processing unit (CPU), a main storing device such as a dynamic random access memory (DRAM), and an auxiliary storing device such as a flash memory. Functions of the controller 50 are implemented by operating the processing device and so forth according to software stored in the auxiliary storing device.

Processing conditions for processing the workpiece 1 are input and registered in the controller (control unit) 50 in advance. Then, the controller 50 controls the respective constituent elements according to the processing condition. The processing conditions are set as appropriate according to the type of workpiece 1 and the desired processing result. Further, the controller 50 controls the respective constituent elements while referring to information sent from the respective constituent elements to cause processing of the workpiece 1 to proceed with a predetermined procedure. That is, the controller 50 includes a storing section 50*a* in which various pieces of information including various processing conditions can be registered and a processing control section 50*b* that controls the respective constituent elements according to the processing condition registered in the storing section 50*a* and performs processing of the workpiece 1.

Moreover, the processing apparatus 2 may include a touch-panel-equipped display (not illustrated) used for input of a command to the controller 50 and display of various kinds of information. Further, the processing apparatus 2 may include a warning unit (not illustrated) that issues a warning to the user by a lamp or warning sound. Moreover, the processing apparatus 2 may include a monitoring unit such as an ammeter that measures the load current value of the rotational drive source of the spindle connected to the cutting blade 40 and a pressure meter that measures the pressure value of a negative pressure generated by the suction source such as a pump connected to the chuck table 10.

In the processing apparatus 2, the frame unit 11 housed in the cassette 48 is sequentially conveyed to the chuck table 10 and is held under suction by the chuck table 10. Then, the workpiece 1 is processed on the chuck table 10 by the processing unit 14 under a predetermined processing condition. The processed workpiece 1 is cleaned by the cleaning unit 44 and thereafter is housed in the cassette 48. After the end of the processing of the workpieces 1 of all frame units 11 that have been housed in the cassette 48 and been loaded in the processing apparatus 2, the cassette 48 is unloaded from the processing apparatus 2.

In the processing apparatus 2, there is a rare case in which operation failure occurs in some of constituent elements in processing of the workpiece 1 and the processing does not proceed as planned. In this case, continuing the processing without any change often leads to not only failure in achievement of a predetermined processing result but also breakage of the workpiece 1 and the cutting blade (cutting tool) 40. Thus, it is preferable for the processing apparatus 2 to have a function of detecting an abnormality of processing that is being executed, and it is preferable to temporarily stop processing of the workpiece 1 and issue a warning to the user or the like of the processing apparatus 2 when some kind of abnormality is sensed while the processing is executed. Further, when the processing apparatus 2 is stopped due to an abnormality, the user or the like checks the states of the processing apparatus 2, the workpiece 1, and so forth and executes the necessary adjustment for the processing apparatus 2 and then causes the processing apparatus 2 to resume the processing.

Figure 5A:
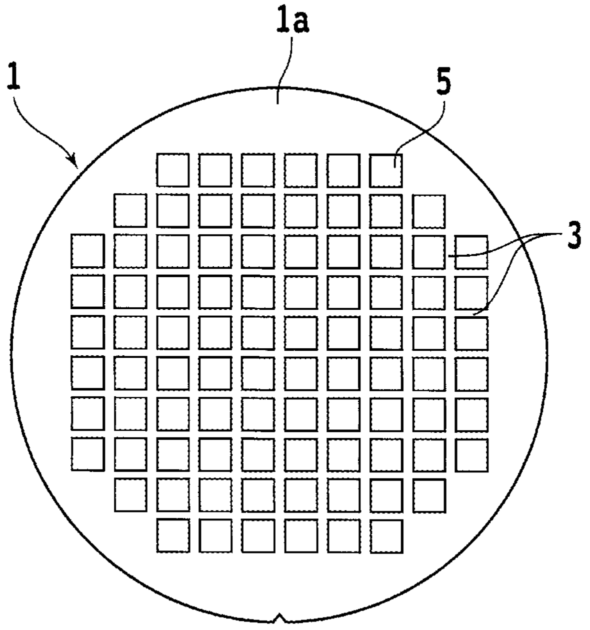
FIG. 5A is a plan view schematically illustrating a front surface side of the workpiece.
Figure 5B:
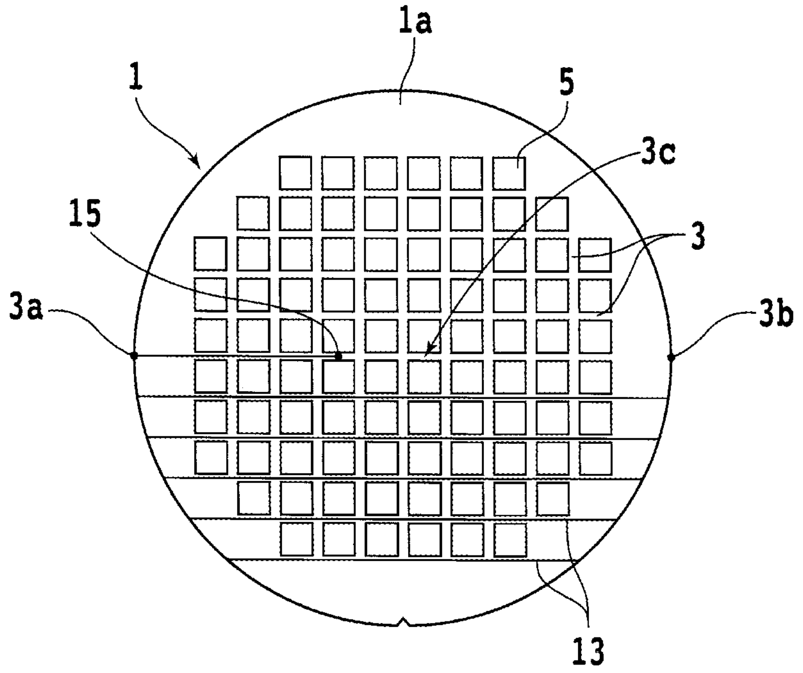
FIG. 5B is a plan view schematically illustrating the front surface side of the workpiece in which processing has been suspended halfway.

Here, when an abnormality is sensed and processing is stopped while the workpiece 1 is processed along the street 3, an unprocessed region is left in the street 3 in the middle of the processing. More detailed description will be made. FIG. 5A is a plan view schematically illustrating the front surface 1*a* of the workpiece 1 that is unprocessed. FIG. 5B is a plan view schematically illustrating the workpiece 1 when an abnormality is detected and processing is stopped while the processing is executed by the processing apparatus 2. When the workpiece 1 is processed (cut) by the processing unit (cutting unit) 14, the processing marks (cut grooves) 13 are successively formed in the respective streets 3. Further, as illustrated in FIG. 5B, in a case in which an abnormality is detected and processing is stopped when a position 15 is being processed while the processing is executed from one end 3*a* to the other end 3*b* of a certain street 3, an unprocessed region 3*c* is left from the position 15 to the other end 3*b* of the street 3.

Thereafter, when the processing of the workpiece 1 is resumed through adjustment of the processing apparatus 2, in a case in which the processing of the unprocessed region 3*c* is resumed from the position 15, an unexpected force may act on the cutting blade (cutting tool) 40 or the workpiece 1, and breakage thereof may occur. The occurrence of an abnormality in the processing mark 13 formed near the position 15 immediately before the stop of the processing in the processing apparatus 2 is one of causes of this.

For example, it is conceivable that the workpiece 1 is not sucked and held with a sufficient force and the workpiece 1 floats up or vibrates when the negative pressure caused to act on the workpiece 1 by the chuck table 10 is weak in processing of the position 15. Further, it is conceivable that the cutting blade 40 and so forth are not sufficiently cooled and the abrasive part of the cutting blade 40 thermally expands when an amount of the cutting water supplied to the cutting blade 40 and so forth is small in processing of the position 15. In such a case, the processing mark 13 that is abnormal may be formed at the position 15 on the workpiece 1.

Moreover, when abnormal variation has occurred in the drive current of the rotational drive source that rotates the spindle to which the cutting blade 40 is connected, there is a possibility that breakage or deformation of the cutting blade 40 or meandering or position deviation of the processing mark 13 has occurred. When processing is resumed at the position 15 at which the abnormality has occurred as above, an unexpected force is applied to the cutting blade 40 and so forth.

Further, when processing is stopped, the raising-lowering unit 18*b* is actuated, and the cutting blade 40 is raised from the workpiece 1 and is moved away from the workpiece 1. Thus, when the processing is resumed, the cutting blade 40 is lowered in the vicinity of the position 15 and is caused to cut into the workpiece 1 from the upper side cautiously and carefully. However, when the cutting blade 40 is caused to cut into the workpiece 1 from the upper side, a fracture referred to as chipping is liable to occur at the outer edge of the processing mark 13. Therefore, the lowering of the quality of the formed processing mark 13 may also occur possibly, and breakage of a formed chip may also occur, in some cases.

Thus, there is a case in which, when an abnormality is sensed and processing is stopped, reprocessing for the unprocessed region 3*c* of the street 3 in the middle of the processing is not executed and the processing is resumed from the next street 3. In this case, the street 3 processed when the processing is stopped is let stand. Therefore, an undivided region is caused in the workpiece 1, and a problem that the number of obtained chips decreases arises. It is also conceivable that the user operates the processing apparatus 2 so as to normally resume the processing of the workpiece 1 from the vicinity of the region in which the processing has been stopped. However, in this case, labor and time are required, and the processing efficiency significantly lowers. Thus, in the processing apparatus 2 according to the present embodiment, when processing is stopped due to an abnormality, the workpiece 1 is reprocessed without applying a load to the cutting blade (processing tool) 40 and so forth and without significantly lowering the number of manufactured device chips and the processing efficiency. In the following, regarding the processing apparatus 2 according to the present embodiment, description will be continued with focus on a configuration that stops processing when an abnormality is detected in the processing and that thereafter reprocesses the workpiece 1.

First, description will be made about a configuration that monitors whether or not an abnormality is present in processing and stops the processing when an abnormality is detected. In the processing apparatus 2, the operation situation of the respective constituent elements is monitored by an ammeter that measures the load current value of the rotational drive source of the spindle connected to the cutting blade 40, a pressure meter that measures the pressure value of the negative pressure that acts at the chuck table 10, and a flowmeter that measures the flow rate of the cutting water. Alternatively, in the processing apparatus 2, the workpiece 1 obtained after processing is photographed by the imaging unit 34, and the processing result is evaluated from a captured image.

For example, the controller (control unit) 50 of the processing apparatus 2 has an abnormality detecting section 50*c* that detects an abnormality that occurs while the workpiece 1 is processed by the processing unit 14. The abnormality detecting section 50*c* detects the occurrence of an abnormality when the load current value of the rotational drive source of the spindle, the pressure value of the negative pressure that acts at the chuck table 10, or the flow rate of the cutting water has exhibited unusual variation. Alternatively, the abnormality detecting section 50*c* causes the imaging unit 34 to image a position processed by the processing unit 14 on the workpiece 1 and detects an abnormality on the basis of a captured image acquired by the imaging unit 34. The processing control section 50*b* of the controller 50 suspends processing of the workpiece 1 by the processing unit 14 when an abnormality is detected by the abnormality detecting section 50*c*. For example, the processing control section 50*b* stops the processing feed unit 6 to suspend processing feed of the chuck table 10 and so forth and actuates the raising-lowering unit 18*b* to raise the cutting blade 40.

Further, for example, the controller 50 may cause the imaging unit 34 to successively image the processing marks 13 formed in the workpiece 1 by processing and cause obtained captured images to be successively displayed on the touch-panel-equipped display. The user or the like of the processing apparatus 2 may monitor whether or not an abnormality is present through visually recognizing the processing marks 13 that appear in the captured images successively displayed. Moreover, when perceiving the occurrence of an abnormality, the user or the like inputs a command to stop the processing to the processing apparatus 2 and stops the processing. That is, the detection of an abnormality does not need to be executed by functions of the controller 50.

In this manner, the processing is suspended with the unprocessed region 3*c* left while the processing unit 14 is caused to process the workpiece 1 from the one end 3*a* to the other end 3*b* of the street 3 with relative movement of the chuck table 10 and the processing unit 14 along the processing feed direction by the processing feed unit 6. In this case, the controller 50 acquires information relating to the street 3 in which the unprocessed region 3*c* is left in the workpiece 1 and the position 15 at which the processing has been stopped, and causes the storing section 50*a* to store the information.

Then, the controller 50 rotates the chuck table 10 by 180 degrees by the rotation unit 10*e* before resuming the suspended processing. Alternatively, the controller 50 resumes the processing from the street 3 planned to be processed next to the street 3 in which the processing has been suspended, and rotates the chuck table 10 by 180 degrees by the rotation unit 10*e* after the processing has proceeded to a predetermined stage. Thereafter, the controller 50 causes the processing unit 14 to process the unprocessed region 3*c* of the workpiece 1 from the other end 3*b* of the street 3 while moving the chuck table 10 and the processing unit 14 relative to each other along the processing feed direction by the processing feed unit 6. That is, the street 3 in which the unprocessed region 3*c* is left is processed in the opposite direction.

Figure 6A:
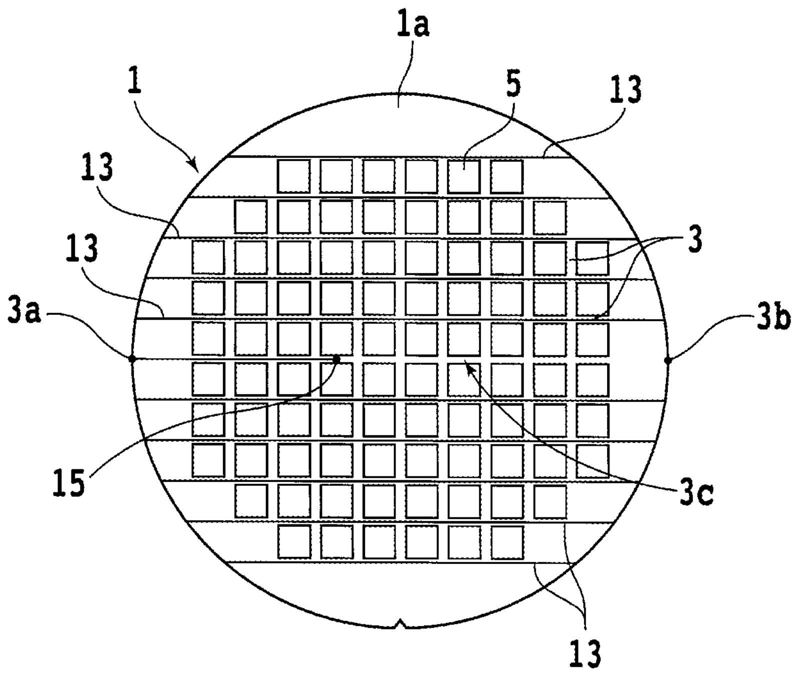
FIG. 6A is a plan view schematically illustrating the front surface side of the workpiece in which processing has been suspended once and the processing has been resumed.
Figure 6B:
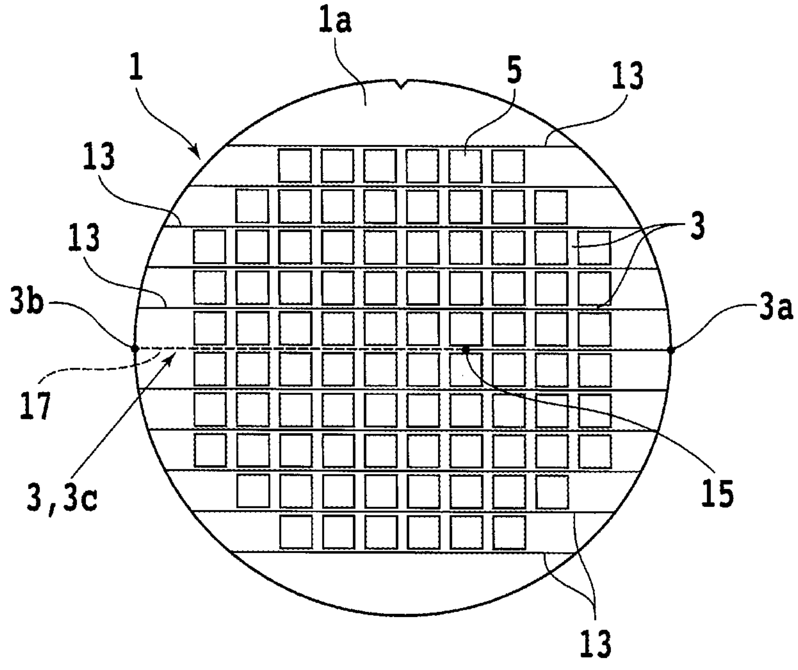
FIG. 6B is a plan view schematically illustrating the front surface side of the workpiece in which an unprocessed region is processed from an opposite side.

FIG. 6A is a plan view schematically illustrating the workpiece 1 for which, after processing has been suspended, the street 3 in which the unprocessed region 3*c* is left is left, and processing along all of other streets 3 parallel to the left street 3 has been executed. Further, FIG. 6B is a plan view schematically illustrating the workpiece 1 for which subsequently the chuck table 10 has been rotated by 180 degrees by the rotation unit 10*e* and the street 3 in which the unprocessed region 3*c* has been left has been reprocessed in the opposite direction, and a processing mark 17 has been formed. In FIG. 6B, the processing mark 17 formed by the reprocessing is illustrated by a dashed line for convenience of explanation.

The controller 50 reads out the information relating to the street 3 including the unprocessed region 3*c*, the information relating to the position 15, and so forth stored in the storing section 50*a* and decides the position from which reprocessing is to be executed. Then, the reprocessing is started from the other end 3*b* of the street 3. This reprocessing is executed similarly to the normal processing executed from the one end 3*a* of the street 3. Hence, an unexpected force does not act on the cutting blade (processing tool) 40 or the workpiece 1 differently from the case in which the reprocessing is started from the position 15 near which the processing mark 13 that is not normal is formed. Further, abnormal chipping is not formed at the outer edge of the processing mark 17 differently from a case in which the cutting blade 40 is caused to cut into the workpiece 1 from the upper side to execute reprocessing.

Moreover, when the reprocessing is executed in this way, the unprocessed region 3*c* is not left in the workpiece 1, and therefore the maximum number of device chips can be manufactured from the workpiece 1. However, there is a possibility that normal processing is not executed and the processing mark 13 that is normal is not formed in the vicinity of the position 15, and it is also conceivable that a device chip with high quality is not obtained from the vicinity of the position 15. Thus, it is preferable that a device chip formed from the workpiece 1 in the vicinity of the position 15 be subjected to a special inspection step or be discriminated from the other device chips formed.

The reprocessing from the other end 3*b* of the street 3 may be ended immediately before the position 15 that is the end point of the unprocessed region 3*c*. In this case, the cutting blade (processing tool) 40 does not process the position 15, at which possibly the processing mark 13 that is abnormal is formed, and therefore breakage of the cutting blade 40 and so forth attributable to execution of processing near the processing mark 13 that is abnormal is prevented. However, the processing apparatus 2 according to the present embodiment is not limited thereto, and the reprocessing may proceed to the position 15.

When the cutting blade 40 of the processing unit 14 has proceeded to the position 15 or the vicinity thereof, the reprocessing is ended by actuating the raising-lowering unit 18*b* to raise the cutting blade 40. Then, after the whole of predetermined processing including the reprocessing is executed for the workpiece 1, the frame unit 11 including the workpiece 1 is carried out from the chuck table 10.

As above, in the processing apparatus 2 according to the present embodiment, even when an abnormality is detected in processing of the workpiece 1 and the processing is suspended, the street 3 including the unprocessed region 3*c* can be reprocessed without causing breakage in the cutting blade 40 and so forth. Further, when the controller 50 causes the storing section 50*a* to store information relating to the street 3 for which reprocessing is necessary and the position 15 at which processing has stopped, the reprocessing can be executed easily and rapidly without a detailed instruction regarding the reprocessing being given by the user or the like of the processing apparatus 2.

It is preferable that the frequency of the occurrence of an abnormality in processing of the workpiece 1 by the processing apparatus 2 be low. Actually, the frequency of the occurrence of an abnormality is low, and the number of workpieces 1 for which reprocessing is executed by the processing apparatus 2 according to the present embodiment is restrictive. However, in the processing apparatus 2 according to the present embodiment, reprocessing of the workpiece 1 for which the reprocessing is necessary is executed efficiently and stably, and thus processing is completed early also for other workpieces 1 processed subsequently. Therefore, the processing apparatus 2 according to the present embodiment has an advantage for not only processing of the workpiece 1 for which reprocessing is necessary but also processing for the workpiece 1 for which reprocessing does not become necessary eventually. Moreover, even when an abnormality is not detected while multiple workpieces 1 are processed in the processing apparatus 2 and processing for all workpieces 1 is executed without delay eventually, the processing apparatus 2 merely having a function allowing efficient execution of reprocessing is advantageous. For example, there is no need to prepare for inefficient reprocessing in operating the processing apparatus 2.

Figure 7A:
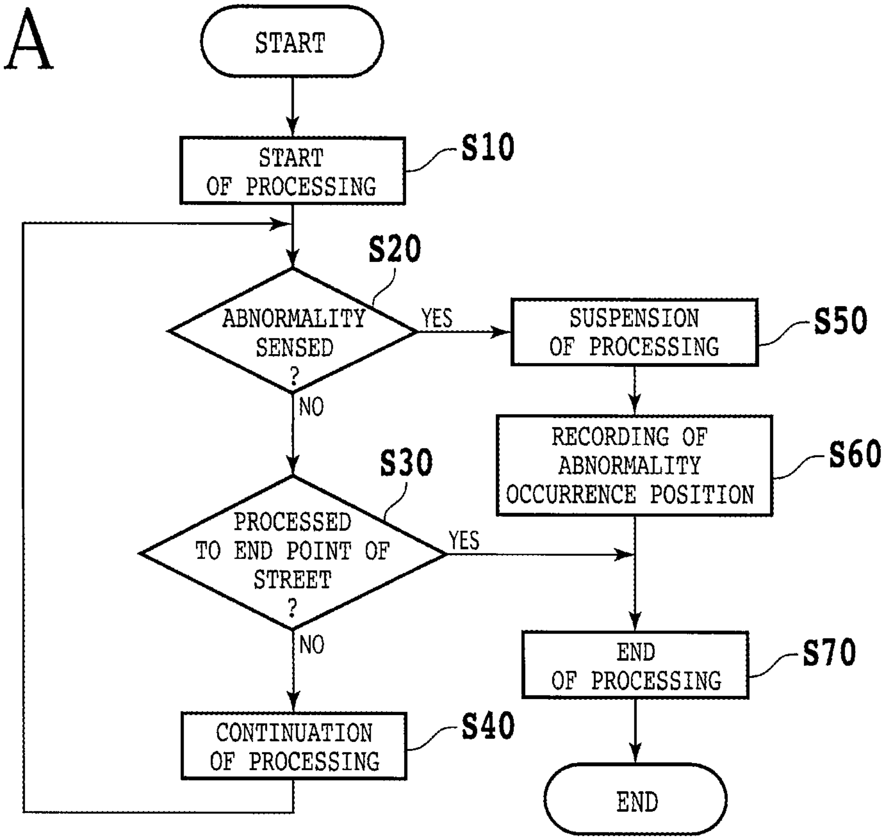
FIG. 7A is a flowchart illustrating a flow of respective steps of a processing method of the workpiece along one street.
Figure 7B:
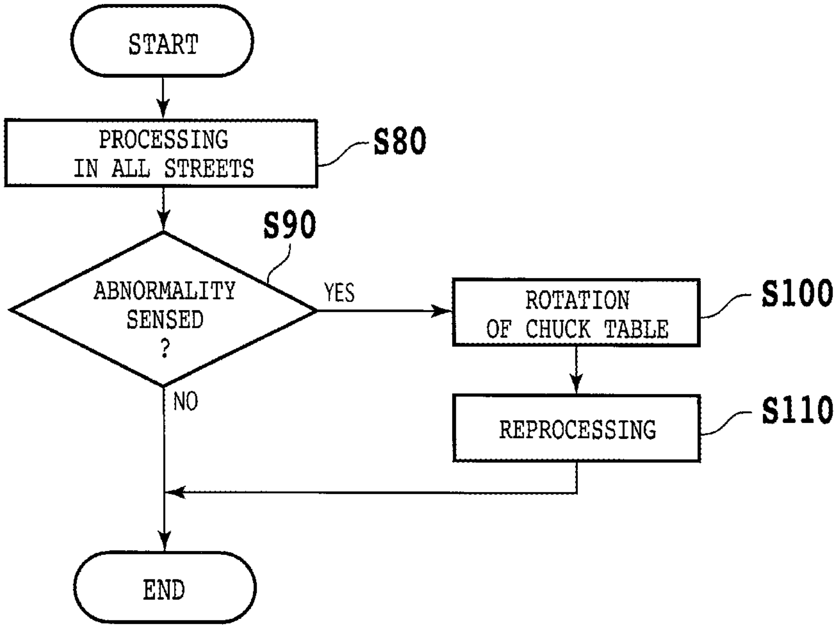
FIG. 7B is a flowchart illustrating a flow of respective steps of a processing method of the workpiece in which reprocessing is executed after the end of predetermined processing when an abnormality has been detected in the processing of the workpiece.

Next, processing methods of the workpiece 1 executed in the processing apparatus 2 according to the present embodiment will be described. The following description is what explains the structure and functions of the processing apparatus 2 according to the present embodiment in terms of the processing methods. FIG. 7A is a flowchart illustrating the flow of the respective steps of a processing method for processing the workpiece 1 along one street 3. FIG. 7B is a flowchart illustrating the flow of the respective steps of a processing method for reprocessing the workpiece 1. In the processing apparatus 2, the processing method of the workpiece 1, to be described with FIG. 7A, is repeatedly executed, and processing is executed along all streets 3. Then, after the workpiece 1 is processed along some of the streets 3 or after the workpiece 1 is processed along all streets 3, the processing method for reprocessing the workpiece 1, to be described with FIG. 7B, is executed according to need.

First, the frame unit 11 is conveyed to the chuck table 10 of the processing apparatus 2, and the chuck table 10 is caused to suck and hold the workpiece 1 with the interposition of the dicing tape 9. In FIG. 3, a sectional view of the workpiece 1 held under suction by the chuck table 10 is schematically illustrated. Next, the upper surface of the workpiece 1 is imaged by the imaging unit 34 to detect the extension direction of the streets 3, and the chuck table 10 is rotated by the rotation unit 10*e* to align the orientation of the streets 3 with the processing feed direction (X-axis direction). Then, the processing method whose flow is illustrated in FIG. 7A is executed for the street 3 to be processed first. First, the cutting blade 40 is positioned above an extended line of the street 3 to be processed first, rotation of the cutting blade 40 is started, and the cutting blade 40 is lowered to a predetermined height position. Then, the processing feed unit 6 is actuated, and processing feed of the chuck table 10 and the processing unit 14 is executed relatively. Thereupon, the abrasive part of the cutting blade 40 gets contact with the workpiece 1, and processing of the workpiece 1 is started (S10). At this time, the cutting water is supplied from the cutting water supply nozzle 42 to the cutting blade 40 and so forth.

The abnormality detecting section 50*c* or the user of the processing apparatus 2 monitors the processing apparatus 2 while the workpiece 1 is processed. Then, when the abnormality detecting section 50*c* senses an abnormality (S20), the controller 50 suspends the processing by the processing unit 14 (S50). Alternatively, when the user or the like of the processing apparatus 2 senses some kind of abnormality (S20), the user or the like inputs a command to suspend the processing by the processing unit 14 to the controller 50 and suspends the processing (S50). Then, when an abnormality is sensed and processing is suspended in the processing apparatus 2, the position at which the abnormality has occurred is recorded (S60). That is, the storing section 50*a* of the controller 50 stores information relating to the position 15 at which the abnormality of the workpiece 1 has been sensed and the processing has been stopped, the street 3 in which the unprocessed region 3*c* is left, and so forth.

Further, in a case in which an abnormality is not sensed while the workpiece 1 is processed along this street 3 (S20), when the processing has not proceeded to the end point of the street 3 (S30), the processing is continued without any change (S40). Then, the processing proceeds to the end point of the street 3 as long as an abnormality is not detected. Thereafter, when the cutting blade 40 has processed the end point of the street 3, the processing of this street 3 ends (S70).

After the processing of the workpiece 1 along the one street 3 is completed, indexing feed of the workpiece 1 is executed, and the workpiece 1 is similarly cut along the next street 3. That is, the processing method illustrated in FIG. 7A is newly executed. Then, after processing of all streets 3 along the one direction is completed, the rotation unit 10*e* is actuated, and the orientation of the streets 3 along the other direction is aligned with the processing feed direction. Then, processing of the workpiece 1 is similarly advanced, and the processing is completed along all streets 3. When being normally processed along all streets 3, the workpiece 1 is divided into individual device chips. Further, reprocessing is executed when the processing does not normally proceed in some of the streets 3, and an abnormality is detected and the processing is suspended, and the unprocessed region 3*c* is left.

In FIG. 7B, the flow of the processing method of a workpiece in which reprocessing is executed according to need after all streets 3 are processed is illustrated. For example, after each step is executed along the flow illustrated in FIG. 7A and processing is executed for all streets 3 (S80), when the street 3 in which an abnormality has been sensed in the processing and the processing has been suspended is present (S90), reprocessing for this street 3 in which the unprocessed region 3*c* is left is prepared. In this case, first the rotation unit 10*e* is actuated, and the chuck table 10 is rotated to align the orientation of the street 3 that becomes the target of the reprocessing with the processing feed direction (X-axis direction). At this time, the chuck table 10 is rotated by 180 degrees by the rotation unit 10*e* from the state when this street 3 has been processed first such that the processing may proceed in the opposite direction of the direction when this street 3 has been processed first.

The chuck table 10 does not need to rotate by 180 degrees at once. That is, it suffices to achieve the state in which the chuck table 10 is rotated by 180 degrees from the state when the street 3 that becomes the target of the reprocessing has been processed first. More specifically, in a case in which, after an abnormality is detected and the processing is suspended while this street 3 is processed, processing of other streets 3 parallel to this street 3 is executed and subsequently the reprocessing is executed, the chuck table 10 is rotated by 180 degrees. Further, the reprocessing may be immediately executed after an abnormality is detected and the processing is suspended while this street 3 is processed. The chuck table 10 is rotated by 180 degrees also in this case. On the other hand, when processing of other streets 3 that are not parallel to this street 3 is executed after an abnormality is detected and the processing is suspended while this street 3 is processed, the chuck table 10 has already been rotated at this timing. When subsequently the reprocessing is executed, the chuck table 10 is rotated to cause this street 3 that becomes the target of the reprocessing to be reprocessed in the opposite direction. This achieves the state in which the chuck table 10 is rotated by 180 degrees from the state when this street 3 has been processed first.

As above, rotating the chuck table 10 by 180 degrees means orienting the street 3 that becomes the target of the reprocessing in the opposite direction to the direction at the time of normal processing. After the chuck table 10 is rotated as above (S100), the reprocessing is subsequently executed (S110).

When the reprocessing is executed, the processing control section 50*b* reads out the information relating to the position 15 at which the processing has been stopped, the street 3 in which the unprocessed region 3*c* is left, and so forth recorded in the storing section 50*a*. Then, in the reprocessing, the unprocessed region 3*c* is processed from the other end 3*b* (see FIG. 6B and so forth) of the street 3. That is, the cutting blade 40 is positioned outside relative to the other end 3*b* of the street 3, the cutting blade 40 is rotated, and the processing unit 14 is lowered to a predetermined height position. Thereafter, the processing feed unit 6 is actuated, and processing feed of the chuck table 10 and the processing unit 14 is executed relatively. This causes the cutting blade 40 to cut into the unprocessed region 3*c* of the street 3 from the side of the other end 3*b*. Thereupon, the processing mark 17 is formed. The reprocessing is executed until the processing mark 17 is formed in the vicinity of the position 15 or at the position 15.

When an abnormality is never detected and the processing is not suspended while the workpiece 1 is processed along all streets 3 (S90), the reprocessing does not need to be executed. After the reprocessing of the workpiece 1 (S110) is completed or after it is confirmed that the reprocessing is not necessary, the frame unit 11 is carried out from the chuck table 10.

After the workpiece 1 is divided into individual device chips by the processing, the individual device chips are picked up from the dicing tape 9 and are mounted on a predetermined mounting target. In the processing apparatus 2 according to the present embodiment, as many device chips as possible can efficiently be fabricated even when some kind of abnormality has occurred in processing of the workpiece 1.

The present invention is not limited to the description of the above-described embodiment and can be carried out with various changes. For example, in the above-described embodiment, description has been made about the case in which the multiple streets 3 set in the front surface 1*a* of the workpiece 1 are sequentially processed from an end of the workpiece 1 as illustrated in FIG. 5B and so forth. However, the processing apparatus 2 according to one aspect of the present invention is not limited thereto. That is, there is no particular limitation on the order of processing of the respective streets 3.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A processing apparatus that processes a workpiece, the processing apparatus comprising:

a chuck table having a holding surface that holds the workpiece, wherein the workpiece includes a plurality of streets that intersect each other;

a processing unit that processes the workpiece held by the chuck table along a corresponding one of the streets;

a processing feed unit that moves the chuck table and the processing unit relative to each other in a direction parallel to the holding surface along a processing feed direction;

a rotation unit capable of rotating the chuck table around a rotation axis along a direction perpendicular to the holding surface; and a controller that controls the chuck table, the processing unit, the processing feed unit, and the rotation unit, wherein the controller is configured to:

sense an abnormality in at least one street of the plurality of streets while the processing unit is processing the workpiece from one end to an opposing other end of the at least one street;

suspend the processing of the workpiece by the processing unit leaving an unprocessed region between a position of the abnormality and the other end of the at least one street;

rotate the chuck table by 180 degrees using the rotation unit; and cause the processing unit to process the unprocessed region of the at least one street on the workpiece from the other end of the at least one street while moving the chuck table and the processing unit relative to each other along the processing feed direction by the processing feed unit such that the processing unit does not process the position of the abnormality.

2. The processing apparatus according to claim 1, wherein the processing unit is a cutting unit that cuts the workpiece by a circular annular cutting blade.

3. The processing apparatus according to claim 1, wherein the processing unit is a laser processing unit that irradiates the workpiece with a laser beam to execute laser processing on the workpiece.

4. The processing apparatus according to claim 1, wherein the controller has an abnormality detecting section that detects the abnormality that occurs while the workpiece is processed by the processing unit, and suspends processing of the workpiece by the processing unit when the abnormality is detected by the abnormality detecting section.

5. The processing apparatus according to claim 4, further comprising:

an imaging unit that images the workpiece held by the chuck table, wherein the abnormality detecting section causes the imaging unit to image a position processed by the processing unit on the workpiece and detects the abnormality on a basis of a captured image acquired by the imaging unit.

6. The processing apparatus according to claim 1, wherein the processor includes a storing section that stores information relating to the position at which the abnormality of the workpiece has been sensed and the processing has been stopped.

* * * * *